United States Patent [19]

Holfeld

[11] 3,777,823
[45] Dec. 11, 1973

[54] AGRICULTURAL IMPELEMENT TRAILERS

[76] Inventor: Armin E. Holfeld, Box 187, Watson, Saskatchewan, Canada

[22] Filed: Apr. 12, 1971

[21] Appl. No.: 133,306

[52] U.S. Cl. .............................. 172/328, 172/677
[51] Int. Cl. ........................................... A01b 59/00
[58] Field of Search ................... 172/413, 677, 679, 172/680, 328; 280/414.5

[56] References Cited
UNITED STATES PATENTS

| | | | |
|---|---|---|---|
| 2,866,281 | 12/1958 | Breaux | 172/328 |
| 2,515,991 | 7/1950 | Dufour | 172/677 X |
| 2,691,930 | 10/1954 | Forgy | 172/328 |
| 2,797,542 | 7/1957 | Werster et al. | 172/413 X |
| 2,970,656 | 2/1961 | Kampe | 172/413 |
| 2,777,375 | 1/1957 | Carlin et al. | 172/413 X |
| 3,534,819 | 10/1970 | Grover | 172/413 X |
| 3,039,633 | 6/1962 | Mindrum et al. | 280/414.5 X |

Primary Examiner—Robert E. Pulfrey
Assistant Examiner—Stephen C. Pellegrino
Attorney—Eugene E. Stevens and R. H. Stevens

[57] ABSTRACT

A trailer designed to be drawn by a tractor, the trailer having a hitch which connects with the draw-bar of the tractor. The hitch is pivoted to the front end of the trailer frame. The latter carries agricultural implements in soil engagement, and has a wheel in the rear. A radial arm centered on the wheel rises to make a pivotal connection with the rear of the frame, and has an extension above the pivot. A frontal arm pivoted to the frame is connected with its free end to that of the extension, so that a swing of the frontal arm in forward direction by a power unit will swing the radial arm and raise the frame, lifting the implements out of soil engagement. A connection from the frontal arm to the hitch lowers the latter when the frame is raised. When the hitch is disconnected from the tractor a castor wheel carried by the hitch can be swung down to support the hitch and frame in front. Supporting rear of frame on the trailer wheel leaves the greater weight of the frame and implements bearing on the draw-bar to impart more traction to the tractor wheels.

5 Claims, 8 Drawing Figures

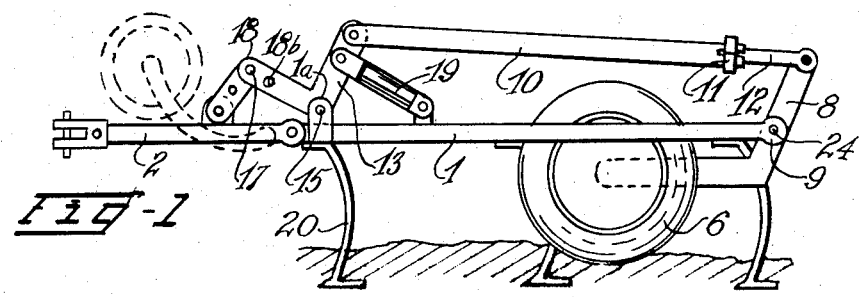
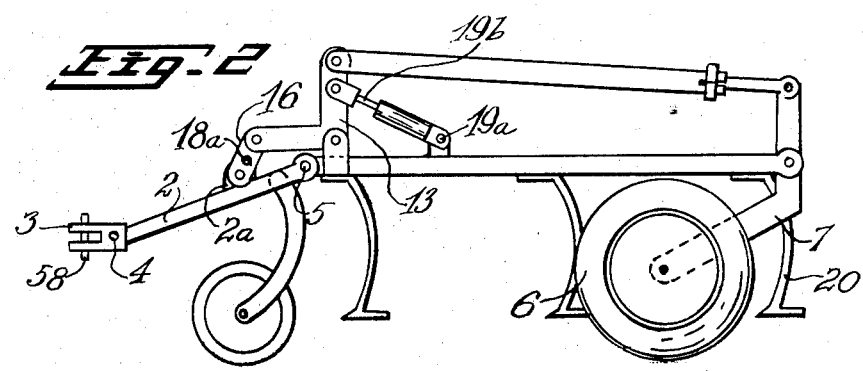
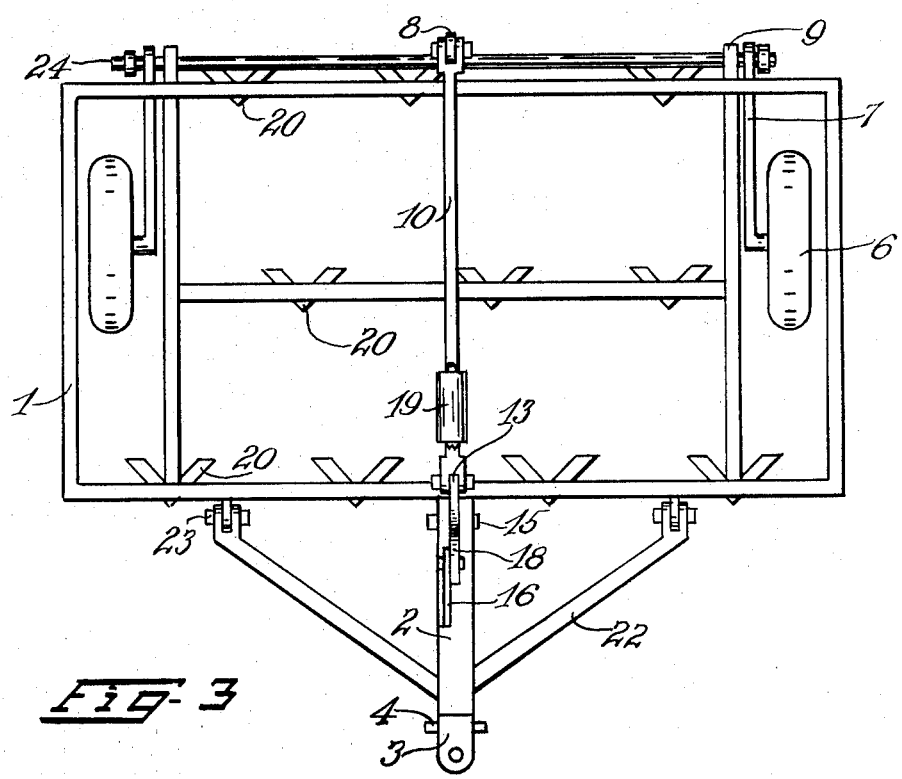

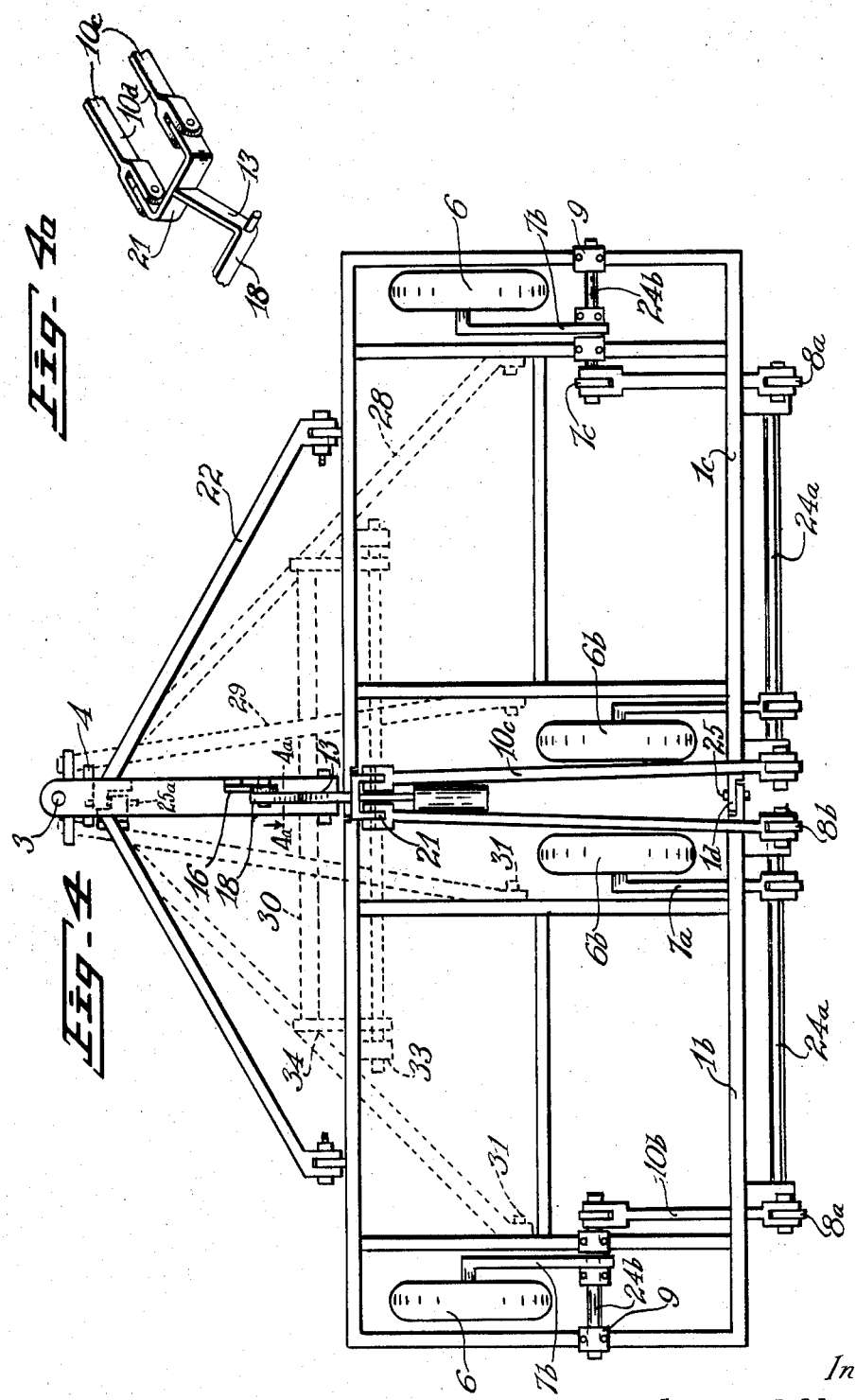

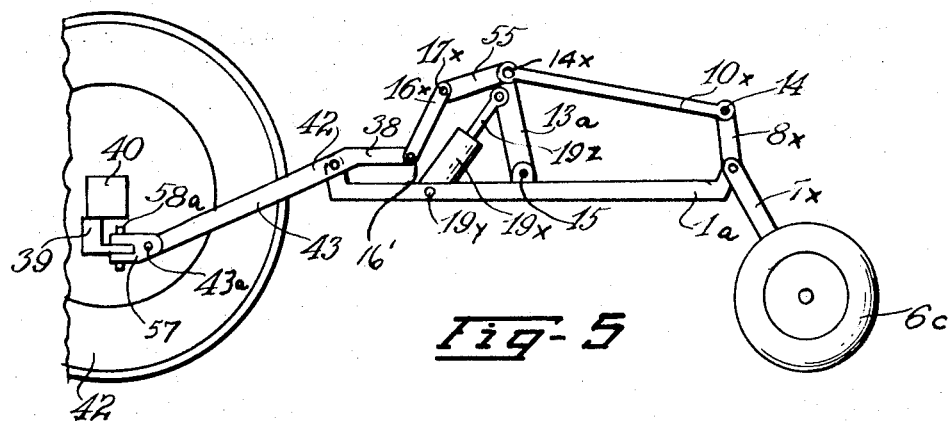
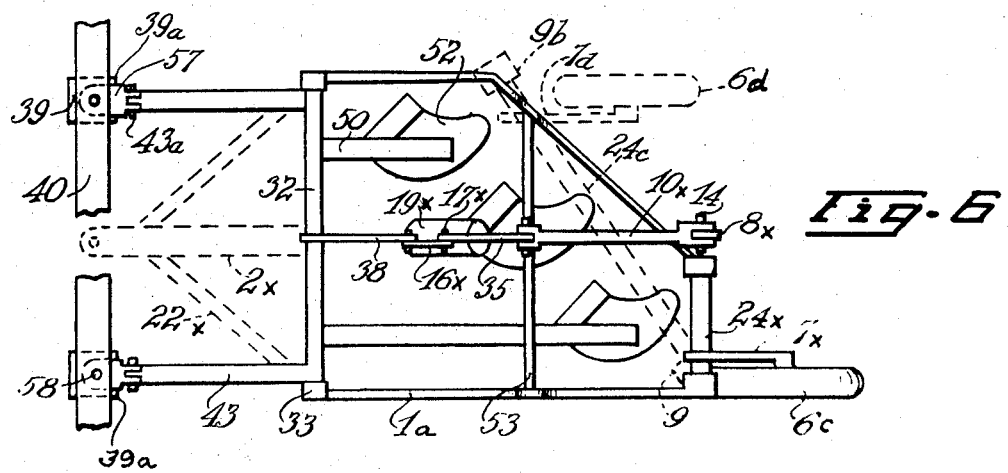
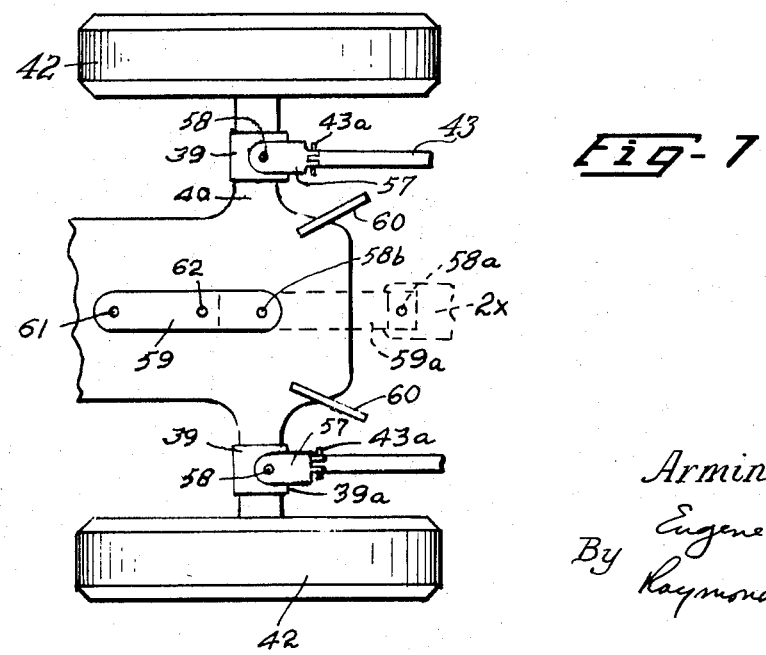

AGRICULTURAL IMPELEMENT TRAILERS

My invention relates to tractor-drawn trailers which carry agricultural implements, and more particularly to means for improving the ground traction of the tractor. The common practice has been to make a tractor-drawn agricultural trailer with a stiff hitch and the wheels or axle more or less in the middle. Thus, only a small amount of pressure was applicable by the trailer hitch to the draw-bar of the tractor; and weights were therefore added to the frame or wheels of the tractor in order to lend it sufficient traction to pull the trailer through a ground-working operation. Further, the stiff hitch was often applied to a low draw-bar, in which event the forward ground-engaging implements operated more deeply than the rear ones, making the plowing or other ground-working operation uneven. It is therefore the main object of the present invention to provide a trailer structure which imposes a sufficient weight on the draw-bar of the tractor to lend it the necessary traction for any required depth of implement operation in direct proportion to load resistance, so that the greater the load the greater the pressure on the tractor draw-bar and consequently the greater the ground engagement or traction of the tractor.

A further object is to provide a trailer equipped with ground wheels in the rear, and a frame carrying soil-working implements and exerting most of its weight on the tractor draw-bar in order to impose down pressure on the tractor wheels.

A still further object is to provide a trailer which has a frame, wheels, an implement hitch, and simple means to raise the frame in relation to the wheels, whereby to draw the implements out of soil engagement and keep the frame level both in the original and raised positions.

Another object is to design a trailer frame with a horizontally-pivoted hitch adjustable to different heights of tractor draw-bars.

An additional object is to provide the trailer hitch with a castor wheel, so that when the trailer is unhooked and bogged down with its implements in wet soil, the hitch will not dig into the soil and prevent the trailer from being drawn in forward direction.

A better understanding of the invention may be gained by reference to the accompanying drawings, in which FIG. 1 is a side view of the improved implement trailer with the implements in lowered position and engaging the soil;

FIG. 2 is a similar view, showing the implements raised to enable the trailer to be drawn with rolling motion over the ground;

FIG. 3 is a top plan view, with an augmented hitch arrangment;

FIG. 4 is a similar view of a trailer modified with a duplex frame;

FIG. 4a is a perspective view of a coupling seen from the section line 4a—4a of FIG. 4;

FIG. 5 is a side view of a further modification with twin connections from the trailer to the draw-bar of the tractor, the ground engaging elements omitted;

FIG. 6 is a top plan view of the showing in FIG. 5, with portions of the tractor draw-bar assembly broken away and a further modification shown in dotted lines; and FIG. 7 is a bottom plan view of the rear portion of the tractor showing a hitching connection for the trailer.

Referring specifically to the drawings, 1 denotes the frame of the trailer in the main embodiment of the invention. The frame receives a central hitch 2 in front pivoted at 5 to the frame; and the front of the hitch receives a clevis 3 which may be rigid or pivoted on a cross-pin 4.

The wheels of the trailer are shown at 6. They are carried by radial arms 7 (see FIG. 3, upper part) extended from a transverse rock-shaft 24 situated behind the frame; and the latter has bearings 9 for the rock-shaft. FIGS. 1 and 3 show that three sets of wing-type ground working implements 20 are attached directly to the frame 1, one set being in front, one in the center, and one in the rear.

The implement-adjusting feature of the invention deals with means to raise and lower the implement-carrying frame 1. Thus, FIGS. 1 and 3 show that the rock-shaft 24 is extended in the center with a rearwardly-inclined radial arm 8. The front end of the frame carries a bearing 1a in the center for pivoting an angle lever 18 at the vertex on a cross-pin 15. The angle lever projects one arm 13 rearwardly in parallelism to the inclined arm 8 at the rear of the frame. The upper ends of the arms 13 and 8 are joined by a long connecting rod 10 in linked relation, the rod preferably receiving a telescoped section 12 for making the length of the rod adjustable; and a nut 11 is employed to fix the adjustment for changing the action of the arms 13 and 8 when the rod is moved forth or back.

It is apparent from FIG. 1 that the forward swing of the arms 13 and 8 will bear on the wheels 6 to raise the implement-carrying frame 1 as seen in FIG. 2 while keeping it level, the arms 13 and 8 now extending in upward direction. This action is procured by the provision of a central hydraulic cylinder 19 pivoted at 19a to the frame and fed by a suitable fluid source (not shown). It is seen that the plunger rod 19b of the cylinder 19 is pivotally connected to the arm 13.

The hitch 2 is usually in a horizontal position during the soil-engaging operation of the implement trailer; and dotted lines in FIG. 1 show that the hitch may have a pivoted arm-carried castor wheel 21 which projects in upward direction and out of the way at such time. The hitch is connected to the angle lever 18 in a manner to become lowered as shown in FIG. 2 when the trailer frame is raised, at which time the arm-carried castor wheel 21 may be swung down to ground level as a front wheel—as seen in FIG. 2—when the trailer is not in use and drawn in forward rolling motion. Suitable hitch-carried stop means retain the castor wheel arm in its two positions. The connection of the hitch to the angle level 18 is by means of a link 16 made with a series of holes 18a to receive end-pins 17. The bottom end-pin is carried by a lug 2a above the hitch 2, while the upper end-pin is carried by the angle lever 18. The holes 18a in the link and a second hole 18b in the angle lever enable the spacing between the hitch and the angle lever to be adjusted to vary the angle of the hitch as desired, making it possible to hitch the trailer to a different tractor whose draw-bar is higher or lower off the ground.

FIG. 3 shows a modification of the hitch to insure its alinement with the angle lever 18 during vertical motion. Thus, the hitch is extended laterally with diagonal braces 22 which make pivoting connections 23 with the trailer frame at their rear ends in line with the center pivot 15.

A further modification of the frame structure is shown in FIG. 4. In this view, the hitch braces 22 of FIG. 3 are shown by full lines and connecting with twin frames 1b and 1c to make the trailer wider and allow large duplex-type implements to flex and follow the contour of the land. The frames meet along the center with overlapping bearings 1d receiving pins 25 which pivot the frames to each other; and the braces 22 meet in overlapping relation to be pivoted on a pin 25a. The frames carry alined rock-shafts 24a at the rear having the purpose of the correspondingly-positioned shaft 24 of the main embodiment of the invention to extend radial arms 7a in forward direction, such arms carrying a pair of central wheels 6b. However, the side wheels 6 in the FIG. 4 modification are now operable by way of radial arms 7b from short rock-shafts 24b situated forwardly of the rock-shafts 24a and journaled in frame bearings 9x. The rock-shafts 24b have upward arms 7c at their inner ends connected by shorter versions 10b of the top rod (FIG. 1) to radial arms 8a sing from the outer ends of the rock-shafts 24a. The inner ends of these (24a) also carry radial arms 8b, which make pivotal connections at the top with twin top rods 10c which extend forwardly—like rod 10 in FIG. 1—to terminate with forked end portions 10d as seen in the upper center of FIGS. 4 and 4a. These end portions 10d receive the arms of a clip 21 and pivot the same on cross-pins 26.

FIG. 4a shows that the clip 21 has a central forwardly and downwardly extending web 13x corresponding to 13 in FIGS. 1, 2 and 3 and continues like the parts 13, 15, 18, 16, 19b and 19 (see left-center of FIG. 1), so as to form the frame-raising and hitch-lowering feature of the FIG. 4 trailer.

Dotted lines in FIG. 4 show a second modification of the hitch. Thus, it is seen that the hitch for the wider trailer may also be made with four braces 28 and 29 and a cross-spacer 30 for them; and the connections from the braces 28 and 29 to the trailer frame may be either by way of links 34 and a rear cross-shaft 32 journaled in frame bearings 33, or by making the braces 28 long enough to reach back into the central portion of the trailer frames 1b, 1c, where they are pivoted on side pins 31 carried by the frames, 1b, 1c.

A further modification illustrated in FIGS. 5 to 7 employs a linkage similar in part to that in the main embodiment, but operative in rearward instead of forward direction to raise the frame of the trailer. Also, this modification makes twin connections by means of bars 43 with the draw-bar 40 of the tractor. More specifically, 1a denotes the frame of the trailer which is supported at the rear by a wheel 6c, as seen in FIG. 5.

However, the FIG. 5 and 6 trailer may be drawn by means of a central hitch 2x corresponding to hitch 2 in FIGS. 1, 2 and 3 (see dotted lines at the left in FIG. 6). In such use, lateral stability of the trailer may be insured by building the rear of the frame 1a (FIGS. 5 and 6) as a rock-shaft 24c, with a bearing 9a at one side and another 9b on the other side, and adding a second wheel 6d. Wheel 6d is supported by a radial arm 7d from the rock-shaft 24c, this modification being represented as stated by dotted lines in FIG. 6.

Full lines in FIG. 6 indicate that the rear end of the trailer frame is occupied by a transverse rock-shaft 24x from which a radial arm 7x extends to the wheel 6c. As also seen in FIG. 6, the trailer frame 1a carries longitudinally-directed bars 50 within it from which the soil-working plows or shanks 52 are suspended, the bar for the middle plow 52 having been omitted for the sake of clarity.

Still referring to FIGS. 5 and 6, the mechanism for raising and lowering the trailer frame 1a, originates with a cross-shaft 53 in the frame, to which the lower end of an upstanding lever 13a (FIG. 5) is pivoted. The radial arm 7x of the wheel 6c is also extended from the rock-shaft 24x with an upward lever 8x; and the levers 8x and 13a are joined by a top rod 10x pivoted to them at 14, 14x, respectively. The front end of the rod 10x also extends with a link 55 (FIG. 5) in forward direction with a pivot at 17x with a downward link 16x. The link 16x makes pivoting connection 16' at its lower end with the rearward tongue 38 that is functionally integral with a cross-bar 32 whose ends are journalled in side bearings 33 carried by the front end of the frame 1a, as seen in the left-central portion of FIG. 6.

FIGS. 5 and 6 show that the cross-bar 32 has laterally spaced companion forward arms 43 terminating with horizontal pivots 43a provided by terminal clevises 57. These clevises 57 are horizontally slotted to receive the flanges 39a of lugs 39 that are welded or bolted to the under side of the tractor rear axle 40; and vertical pivot pins 58 connect the clevises 57 and lug flanges 39a, whereby to create universal joints between the arms 43 and the tractor rear axle 40.

The final unit of the FIG. 5 and 6 control mechanism is a hydraulic cylinder 19x pivoted at 19y in the frame and having its plunger rod 18z directed to make a pivoting joint with the upper part of the lever 13a. As the mechanism appears in FIG. 5, the frame of the trailer is in the low position engaging its implements 52 (not shown in FIG. 5) with the soil. However, when a source of hydraulic fluid (not shown) is operated to extend the plunger rod 19z, the levers 13a and 8x will swing toward the right from the positions in FIG. 5 to pivot the wheel 6c in forward direction of the rock-shaft 24x and raise the rear part of the frame. The advance of the plunger rod 19z will also cause the lever 13a to straighten the links 16x and 55, and raise the pivot 17x. This action will rotate the frontal hitch 32–43 counterclockwise. Since the wheels 42 of the tractor are rigid, the effect will be to also raise the trailer frame at the front. The frame will thus remain level, and its rising movement will lift the implements 52 (FIG. 6) out of the soil and enable the tractor and trailer to move in rolling ground contact. Dotted lines in FIG. 6 show a further modification wherein only one central hitch arm 2x may be used, with diagonal braces 22x leading to the tractor frame. FIG. 7 shows the arms 43 of the trailer connected to clevises carried by lugs 39 fastened to tractor rear axle 40.

Dotted lines in FIG. 7 show single hitch 2x, also shown in FIG. 6, connected to standard drawbar 59a by a pin 58a. However, when large duplex-type implement trailers are used (FIG. 4), it may be necessary to shorten draw-bar as indicated by solid lines 59, shorter draw-bar being rigidly fastened to tractor by bolts or pins 61 and 62. Trailer hitch clevis 3 of FIG. 4 is hitched to shorter drawbar 59 by a pin 58a. Hitch radial-swing stops 60 are supplied to prevent tractor operator from turning too sharply in which case tractor wheels 42 may make contact with trailer hitch 2 or braces 22 (FIG. 4) and damage may result.

The shorter tractor drawbar 59 with stops 60 are essential when pulling large duplex type implement (FIG.4) trailers when implements are engaged in the soil and tractor is climbing a steep hill. This is so because the structure of the tractor is such that if too great a pressure is exerted, on the standard drawbar 59 with this particular trailer hitch arrangement, the tractor will rear up in front (lift off the ground). In other words, the weight of the front of the tractor is insufficient to keep the front wheels on the ground if the load or weight is too great on the standard drawbar.

It will be now apparent that the improved trailer has a number of advantageous features. First, its wheels are at the rear, throwing the weight of the frame and the parts carried by it mostly at the forward end of the trailer to bear down on the tractor drawbar and lend added traction to the tractor wheels. Further, a hitch is provided which is pivoted to rise at the rear when the trailer is raised, but remains at the height fo the tractor drawbar in front. Further, small adjustments can be made in this respect to adapt the hitch to different heights of tractor draw-bars. Further, a raising mechanism is provided which operates in parallelism to maintain the trailer level in either the low or high position.

I claim:

1. In an agricultural implement-carrying trailer attachable behind the draw-bar of a tractor, the combination of a frame, a hitch pivoted from the front end of the latter for attachement to said draw-bar, a wheel at the rear of the frame, an arm from the center of the wheel making a pivotal connection with the rear end of the frame, and means on the frame to swing the arm on said connection for raising and lowering the frame in relation to the wheel, said agricultural implement carrying frame having front and rear portions, agricultural earth engaging implements supported from said frame, said arm from the wheel being pivoted intermediate its ends a frontal arm pivotedly secured to said front end portion of said frame, a telescoped rod connecting the free end of the other end of said first mentioned arm to said frontal arm at a location spaced from the pivot of said frontal arm, a link connecting said frontal arm to said pivoted hitch, and a power unit mounted on said frame and connected to said frontal arm to swing said frontal arm, said rod and said first mentioned arm for raising and lowering said frame in relation to said wheel whereby said agricultural implements are engaged and disengaged from the earth.

2. The structure of claim 1, and a castor wheel carried by the hitch the castor wheel extensible to serve as a wheeled frontal support for the frame when the hitch is detached from the draw-bar.

3. The invention according to claim 1 in which the end of the first mentioned arm carrying the wheel extends rearwardly.

4. The invention according to claim 1 in which means are provided to adjust the effective pivotal movement of the hitch with respect to the movement of the wheel.

5. The invention according to claim 1 in which the frontal arm is an angle lever and the effective length of one of the arms of the angle lever can be adjusted to vary the relative extent of the movement of the wheel and the hitch.

* * * * *